United States Patent
Wang et al.

(10) Patent No.: US 11,177,931 B2
(45) Date of Patent: Nov. 16, 2021

(54) CLOCK TRANSMISSION METHOD AND RELATED DEVICE

(71) Applicant: HUAWEI TECHNOLOGIES CO., LTD., Shenzhen (CN)

(72) Inventors: Jinhui Wang, Dongguan (CN); Xingjian Shi, Wuhan (CN); Feng Wu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/449,443

(22) Filed: Jun. 23, 2019

(65) Prior Publication Data
US 2019/0312717 A1   Oct. 10, 2019

Related U.S. Application Data

(63) Continuation of application No. PCT/CN2017/115319, filed on Dec. 8, 2017.

(30) Foreign Application Priority Data

Dec. 23, 2016 (CN) .......................... 201611205615.3

(51) Int. Cl.
*H04J 14/00* (2006.01)
*H04L 7/00* (2006.01)
(Continued)

(52) U.S. Cl.
CPC .......... *H04L 7/0075* (2013.01); *H04J 3/0647* (2013.01); *H04J 3/1652* (2013.01);
(Continued)

(58) Field of Classification Search
CPC ...... H04J 3/1652; H04J 3/0647; H04J 3/0644; H04J 14/08; H04J 3/0658; H04J 3/1658;
(Continued)

(56) References Cited

U.S. PATENT DOCUMENTS 5,241,543 A * 8/1993 Amada ................. H04J 3/0623
370/509
6,072,810 A 6/2000 Van Der Putten et al.
(Continued)

FOREIGN PATENT DOCUMENTS

CN 101252403 A 8/2008
CN 101651512 A 2/2010
(Continued)

OTHER PUBLICATIONS

ITU-T G.709/Y.1331 Amendment 1, Series G: Transmission Systems and Media, Digital Systems and Networks Digital terminal equipments—General Series Y: Global Information Infrastructure, Internet Protocol Aspects, Next-Generation Networks, Internet of Things and Smart Cities Internet protocol aspects—Transport Interfaces for the optical transport network, Nov. 2016, 250 pages.

*Primary Examiner* — Hibret A Woldekidan
(74) *Attorney, Agent, or Firm* — Kilpatrick Townsend & Stockton LLP

(57) ABSTRACT

Embodiments relate to optical transport technologies, and more specifically, to a clock transmission method. Under this method, a first optical data unit (ODU) container can be obtained. Phase discrimination can be performed on an obtained first clock and a first ODU clock of a transmit end, to generate a first PD value. The first PD value can then be inserted into an overhead of the first ODU container. The first ODU container can be encapsulated into a second ODU container, and the second ODU container can be sent. A rate of the second ODU container is higher than a rate of the first ODU container. The first PD value is transmitted in the first ODU container which is not decapsulated in a subsequent transmission process. Therefore, final recovery of the first clock is not affected, so that a deviation between a finally recovered clock and the first clock is greatly reduced.

17 Claims, 13 Drawing Sheets

(51) Int. Cl.
*H04J 14/08* (2006.01)
*H04Q 11/00* (2006.01)
*H04J 3/06* (2006.01)
*H04J 3/16* (2006.01)
*H04W 88/08* (2009.01)

(52) U.S. Cl.
CPC .......... *H04J 14/08* (2013.01); *H04Q 11/0066* (2013.01); *H04W 88/085* (2013.01); *H04J 3/0673* (2013.01); *H04J 2203/0026* (2013.01); *H04J 2203/0075* (2013.01); *H04L 2212/00* (2013.01)

(58) Field of Classification Search
CPC ............. H04J 3/0673; H04J 2203/0026; H04J 2203/0075; H04J 14/02; H04W 56/00; H04W 56/001; H04W 88/085; H04L 25/03; H04L 2212/00; H04L 7/0075; H04L 7/0337; H04L 7/0338; H04Q 11/0066; H04B 10/5051; H04B 10/5561
USPC .................... 398/52, 154, 155, 68, 187, 188
See application file for complete search history.

(56) References Cited

U.S. PATENT DOCUMENTS

| | | | | |
|---|---|---|---|---|
| 9,019,997 | B1* | 4/2015 | Mok | ........................ H04B 10/07 370/503 |
| 2004/0156325 | A1 | 8/2004 | Perkins et al. | |
| 2008/0181610 | A1* | 7/2008 | Izumi | ..................... H04J 14/08 398/75 |
| 2009/0238320 | A1* | 9/2009 | Ji | .......................... H04J 3/0658 375/362 |
| 2010/0209107 | A1* | 8/2010 | Yin | ....................... H04J 3/0647 398/66 |
| 2011/0182580 | A1* | 7/2011 | Yin | ....................... H04J 3/1652 398/58 |
| 2012/0251106 | A1* | 10/2012 | Valiveti | .................. H04L 47/34 398/45 |
| 2013/0215898 | A1 | 8/2013 | Cao | |
| 2013/0294773 | A1* | 11/2013 | Fu | ..................... H04Q 11/0062 398/45 |
| 2014/0211632 | A1* | 7/2014 | Saad | ..................... H04L 45/50 370/238 |
| 2015/0288538 | A1 | 10/2015 | Fritsch et al. | |
| 2016/0006545 | A1 | 1/2016 | Fu et al. | |
| 2016/0065358 | A1* | 3/2016 | Zhang | .................. H04J 3/0673 375/362 |
| 2016/0226781 | A1 | 8/2016 | Lee | |

FOREIGN PATENT DOCUMENTS

| | | |
|---|---|---|
| CN | 102630384 A | 8/2012 |
| CN | 103997387 A | 8/2014 |
| CN | 104144047 A | 11/2014 |
| CN | 104904148 A | 9/2015 |
| EP | 2139174 A1 | 12/2009 |
| WO | 9639761 A1 | 12/1996 |
| WO | 2012068847 A1 | 5/2012 |

* cited by examiner

CLOCK TRANSMISSION METHOD AND RELATED DEVICE

CROSS-REFERENCE TO RELATED APPLICATIONS

This application is a continuation of International Application No. PCT/CN2017/115319, filed on Dec. 8, 2017, which claims priority to Chinese Patent Application No. 201611205615.3, filed on Dec. 23, 2016, The disclosures of the aforementioned applications are hereby incorporated by reference in their entireties.

TECHNICAL FIELD

This application relates to the field of optical transport network (OTN) technologies, and more specifically, to a clock transmission method.

BACKGROUND

When a Constant Bit Rate (CBR) service is borne by an OTN, a tail end (a receive end) needs to recover a clock of the CBR service, to facilitate successful execution of the CBR service. The clock needs to conform to a standard of the CBR service. In recent years, for example, in an application scenario of a common public radio interface (CPRI,) service, end-to-end frequency offset stability needs to be within ±2 PPB (part per billion). Typically, for example, in a wireless fronthaul application scenario in FIG. 1, a CPRI service sent by a distributed Baseband Unit (BBU) is encapsulated into an optical channel data unit (ODU) container through mapping processing. The ODU container is transmitted to a remote radio unit (RRU) after the ODU container is transmitted by an aggregation ring and wavelength division multiplexing (WDM) is performed on the ODU container by a WDM unit. On an RRU side, the ODU container is decapsulated to obtain the CPRI service.

In the foregoing scenario, a CBR service is used as an example. A Generic Mapping Procedure (GMP) mapping/demapping manner is used to perform rate adaption on the CBR service and a clock during time division multiplexing (TDM), mapping, and encapsulation. One intermediate device is used as an example, and a path along which the CBR service traverses an OTN network is divided into three parts. First, in a transmit end part, the CBR service is first encapsulated into a first ODU container through a BMP, then the first ODU container is encapsulated into a second ODU container, and then the second ODU container is sent to the intermediate device. In an intermediate device part, the received second ODU container is decapsulated to the first ODU container; and then, the first ODU container is encapsulated into the second ODU container again after add/drop multiplexing is performed on the first ODU container by an add/drop multiplexer (ADM), and the second ODU container is sent to a receive end (or referred to as a tail end). In a receive end part, the received second ODU container is decapsulated to the first ODU container, and the CBR service is recovered from the first ODU container. This completes a traversal process of the CBR service.

In the process in which the CBR service traverses the OTN network, GMP mapping and demapping need to be used in a process in which the second ODU container is decapsulated to the first ODU container, and therefore a gap noise is caused to the clock in the process. At the tail end, only an ultra-low bandwidth can be used in a CBR clock recovery loop to implement noise filtration, and therefore a system tracking capability is relatively weak. In addition, when a plurality of intermediate devices are cascaded, gap noises generated in a GMP accumulate, and consequently performance of the CBR clock that is recovered at the tail end degrades.

SUMMARY

Embodiments of this application provide a clock transmission method and a related device, to resolve an existing problem that performance of a CBR clock that is recovered at a tail end degrades due to a gap noise generated in a GMP process and accumulation of a plurality of gap noises.

In view of this, a first aspect of the embodiments of this application provides a clock transmission method. In the method, for example, a to-be-transmitted clock is a first clock. First, phase discrimination is performed on an obtained first clock and a first ODU clock of a transmit end, to obtain a first phase discrimination (PD) value, and the first PD value is inserted into an overhead of a first ODU container obtained by the transmit end. Then, the transmit end encapsulates the first ODU container into a higher-order second ODU container, where the second ODU container has a higher rate than the first ODU container. Finally, the transmit end sends the second ODU container.

Phase discrimination is performed on the first clock and the first ODU clock, to obtain the first PD value. The first PD value is transmitted in the first ODU container, and the first ODU container is not decapsulated in a subsequent transmission process. Therefore, in an entire transmission process, no deviation, for example, no noise, is caused to the first PD value inserted into the first ODU container. In this way, final recovery of the first clock is not affected, so that a deviation between a finally recovered clock and the first clock is greatly reduced.

In some embodiments, the first ODU container may further bear a transmission service. The transmission service is also encapsulated into the first ODU container and continues to be encapsulated into the second ODU container, and then is sent. When the first ODU container is used to transmit only the first clock, some invalid stuff data is inserted into a part that is in the ODU container and that is used to bear data. However, if the first ODU container bears the transmission service, the first ODU container can have a capability of transmitting both some transmission services and the clock. Therefore, fewer resources are needed without affecting transmission of the first clock.

In some embodiments, the first clock is recovered from the transmission service. In other words, the first clock is a clock of the transmission service. This manner can implement some scenarios in which a very high requirement is imposed on a clock deviation, for example, a CBR service.

In some embodiments, the transmission service is a CBR service. When encapsulating the first ODU container, the transmit end actually encapsulates the received CBR service into the first ODU container in a BMP mapping manner. The manner is usually used to encapsulate an ODU container with a relatively low rate.

In some embodiments, a process in which the transmit end encapsulates the first ODU container into the second ODU container is encapsulating the first ODU container into the second ODU container through a GMP. Through the encapsulation, various ODU containers of different rate standards can be encapsulated into higher-order ODU containers to achieve a uniform rate, and can be transmitted.

A second aspect of the embodiments of this application provides a clock transmission method. In the method, an intermediate node first receives a second ODU container, where the second ODU container is sent by a previous hop of the intermediate node. Then, the intermediate node obtains a first ODU clock based on the second ODU container; the intermediate node performs phase discrimination on the first ODU clock and a second ODU clock of the intermediate node, to obtain a second PD value; the intermediate node replaces a first PD value in the second ODU container with a third PD value, where the third PD value is obtained after a difference calculation is performed on the first PD value and the second PD value, and a first clock is obtained by a generation end that generates the first PD value; and the intermediate node sends a target ODU container carrying the third PD value, where a rate of the target ODU container is not lower than a rate of a first ODU container that is in the second ODU container and that bears the first PD value.

It may be learned that the rate of the target ODU container is set, to ensure that the target ODU container is not decapsulated to a level of the first ODU container. In other words, in an entire transmission process, the third PD value is borne in an ODU container whose rate is not lower than the rate of the first ODU container, to ensure that no deviation is caused in the entire transmission process. In addition, the third PD value is obtained after the difference calculation is performed on the first PD value and the second PD value, and the third PD value reflects a relationship between the second ODU clock and the first clock, but has no relationship with the first ODU clock. Therefore, a third PD value that is transmitted to an ODU container of any intermediate node reflects only a relationship between the ODU clock of the current node and the first clock, but has no relationship with an ODU clock of another intermediate node. In this way, when the first clock is recovered at a tail end based on the third PD value, there is no relationship between performance and a quantity of cascaded intermediate nodes.

In some embodiments, the intermediate node may encapsulate the second ODU container into a third ODU container, where a rate of the third ODU container is higher than a rate of the second ODU container. Then, in a process of sending the target ODU container, the third ODU container bearing the third PD value is actually sent. Considering complexity in the transmission process, a rate of an ODU container transmitted between nodes may be higher than the rate of the second ODU container, or certainly may be lower than the rate of the second ODU container, but a minimum rate of the ODU container transmitted between the nodes may not lower than the rate of the first ODU container.

In some embodiments, a specific manner in which the intermediate node obtains the first ODU clock based on the second ODU container may be recovering the first ODU clock from the second ODU container through CDR. To be specific, in this case, it is equivalent that the first ODU clock is actually embedded into the second ODU container, and in the CDR technology, the first ODU clock embedded into the second ODU container is recovered by locking a phase of the received second ODU container. In this manner, clock carried in data can be relatively accurately recovered, especially for a transmission path for receiving data from a neighboring device.

In some embodiments, a process in which the first PD value is replaced with the third PD value may be as follows: First, the intermediate node decapsulates the second ODU container to obtain the first ODU container through a GMP; then the intermediate node performs the difference calculation on the first PD value in the first ODU container and the second PD value, to obtain the third PD value; then replaces the first PD value with the third PD value; and finally, encapsulates the first ODU container bearing the third PD value into the second ODU container, to complete a replacing process of the first PD value.

A third aspect of the embodiments of this application further provides a clock transmission method. In the method, a receive end receives a second ODU container and obtains a second ODU clock of the second ODU container; then, the receive end performs phase discrimination on the second ODU clock and a second clock of the receive end, to generate a fourth PD value, and performs a difference calculation on the fourth PD value and a third PD value borne in the second ODU container, to obtain a fifth PD value, where the third PD value is obtained after a difference calculation is performed on a first PD value and a second PD value, the second PD value is generated after phase discrimination is performed on a first ODU clock and the second ODU clock, the first PD value is obtained after phase discrimination is performed on a first clock and the first ODU clock, the first ODU clock is an ODU clock of a generation end of the first PD value, and the first clock is obtained by the generation end; and finally, the receive end adjusts the second clock as the first clock based on the fifth PD value, and outputs the first clock.

It may be learned that the fifth PD value that is obtained after the fourth PD value is generated and the difference calculation is performed on the fourth PD value and the third PD value actually reflects a relationship between the first clock received by the generation end and the second clock of the receive end. When the fifth PD value is 0, the first clock is equal to the second clock. When the fifth PD value is not 0, the second clock needs to be adjusted. The fifth PD value is used to determine a correspondence between the two clocks. Then, the second clock is adjusted as the first clock, and the first clock is output. This successfully recovers the first clock after the first clock traverses an entire network. In addition, during final recovery, only the relationship between the first clock and the second clock is used for recovery, and therefore there is no relationship between performance recovery and the intermediate node. Therefore, some cascaded intermediate nodes can be ignored.

In some embodiments, a specific process of obtaining the second ODU clock from the second ODU container is as follows: The receive end recovers the second ODU clock from the second ODU container through CDR. This recovery manner can ensure that the second ODU clock embedded into the second ODU container can be accurately extracted.

In some embodiments, a specific process in which the difference calculation is performed on the fourth PD value and the third PD value borne in the second ODU container, to obtain the fifth PD value may be as follows: First, the receive end decapsulates the second ODU container to obtain the first ODU container through a GMP, and then the receive end performs the difference calculation on the third PD value in the first ODU container and the fourth PD value, to obtain the fifth PD value. Actually, because the third PD value is included in the first ODU container, and the first ODU container is included in a payload area of the second ODU container, the second ODU container needs to be decapsulated.

In some embodiments, the first ODU container may further bear a transmission service. In this case, after recovering the first clock, the receive end may further decapsulate the first ODU container through a BMP, to obtain the transmission service in the first ODU container. It may be learned that in the clock transmission method in this embodiment of this application, the transmission service may further be carried, to implement more proper resource application.

In some embodiments, the transmission service is a CBR service, the first clock is a CBR clock that is recovered by the generation end from the transmission service, and the second clock is a second CBR clock. In other words, in the manner, the transmission service is related to the first clock, and the first clock is recovered from the transmission service, so that the service and the clock can be transmitted simultaneously.

In some embodiments, a specific process in which the receive end adjusts the second clock as the first clock based on the fifth PD value may be: performing a LPF calculation by using the fifth PD value as a calculation factor, to obtain a frequency control word, and then tuning a local oscillator based on the frequency control word, to output the first clock. It may be learned that a frequency of the first clock can be determined after the fifth PD value and the second clock are determined, and then, the corresponding frequency control word is generated, and the local oscillator can output the first clock.

A fourth aspect of the embodiments of this application further provides a clock transmission method. The method includes a transmit end, an intermediate node, and a receive end. The transmit end first obtains a first ODU container; performs phase discrimination on an obtained to-be-transmitted first clock and a first ODU clock in the transmit end, to obtain a first PD value; inserts the first PD value into an overhead of the first ODU container; and then, encapsulates the first ODU container into a second ODU container, and sends the second ODU container to the intermediate node, where a rate of the second ODU container is higher than a rate of the first ODU container. The intermediate node first obtains the first ODU clock of the transmit end; performs phase discrimination on the first ODU clock and a second ODU clock in the intermediate node, to generate a second PD value; performs a difference calculation on the second PD value and the first PD value in the second ODU container, to obtain a third PD value; replaces the first PD value in the second ODU container with the third PD value; and then sends the second ODU container to the receive end. The receive end obtains the second ODU clock of the intermediate node connected to the receive end; performs phase discrimination on the second ODU clock and a second clock in the receive end, to obtain a fourth PD value; performs a difference calculation on the fourth PD value and the third PD value in the second ODU container, to obtain a fifth PD value; and then tunes a local oscillator based on the fifth PD value, to output the first clock.

It may be learned that in the method of this application, when encapsulating the first ODU container, the transmit end inserts the first PD value that is obtained after phase discrimination is performed on the first clock and the first ODU clock; and encapsulates the first ODU container into the second ODU container and sends the second ODU container to the intermediate node. Then, after receiving the second ODU container, the intermediate node extracts the first PD value from the second ODU container, performs the difference calculation on the first PD value and the second PD value that is obtained after phase discrimination is performed on the first ODU clock and the second ODU clock in the intermediate node, to obtain the third PD value, and replaces the first PD value with the third PD value. The receive end receives the third PD value in the second ODU container, and performs the difference calculation on the third PD value and the fourth PD value that is generated after phase discrimination is performed on the second ODU clock and the second clock in the receive end, to obtain the fifth PD value. The transmit end directly performs phase discrimination on the first clock and the first ODU clock of the transmit end, and directly compensates the overhead of the first ODU container for the phase discrimination value. In addition, the transmit end and the intermediate node do not recover the first clock, but only generate the phase discrimination value and refresh the compensation for the ODU container. In other words, the intermediate node performs the difference calculation on the phase discrimination value and the compensation value, and finally, the receive end also performs the difference calculation, to cancel a noise of the intermediate node other than a clock noise of the transmit end. Therefore, a noise of the recovered first clock is related to only the noise of the transmit end and a noise of the receive end, and is unrelated to the noise of the intermediate node. This can reduce a quantity of times a noise is generated in a GMP, to reduce a noise of an entire link, thereby improving performance recovery of the first clock.

A fifth aspect of the embodiments of this application further provides an OTN device, including at least one module that is configured to perform the clock transmission method provided in the first aspect or any embodiment of the first aspect of this application.

A sixth aspect of the embodiments of this application further provides an OTN device, including at least one module that is configured to perform the clock transmission method provided in the second aspect or any embodiment of the second aspect of this application.

A seventh aspect of the embodiments of this application further provides an OTN device, including at least one module that is configured to perform the clock transmission method provided in the third aspect or any embodiment of the third aspect of this application.

An eighth aspect of the embodiments of this application further provides an OTN network transmission system, including a transmit end, a receive end, and at least one intermediate node that are configured to perform the clock transmission method provided in the fourth aspect or any embodiment of the fourth aspect of this application.

A ninth aspect of the embodiments of this application further provides an OTN device, including a generalized multiprotocol label switching (GMPLS, Generalized Multiprotocol Label Switching) control panel and an optical-layer unit panel that supports optical cross-connection grooming at an optical layer. The optical-layer unit panel is further connected to a line unit panel, the line unit panel is connected to a cross-connection unit panel, and the cross-connection unit panel is connected to a service processing unit panel. The line unit panel, the cross-connection unit panel, and the service processing unit panel form a module used for cross-connection grooming at an electrical layer. The optical-layer unit panel is further connected to an optical conversion unit and a color optical port used for optical wavelength division multiplexing. The control panel includes a processor, a memory, a transceiver, and an access port. The processor, the memory, and the transceiver are all connected to a bus. The access port is connected to the transceiver to send/receive data. The memory stores program code, and the processor executes the program code in the memory, to implement the clock transmission method in the first aspect, the second aspect, or the third aspect of this application.

A tenth aspect of the embodiments of this application further provides a computer storage medium. The computer storage medium is applied to a GMPLS control panel, the computer storage medium stores program code, and when the program code is run by a processor, GMPLS can be implemented. The computer storage medium includes but is not limited to a flash memory, a hard disk drive (HDD), or a solid state drive (SSD).

DESCRIPTION OF EMBODIMENTS

Embodiments can provide a method for implementing an OTN network-based CBR service. In the method, an intermediate node does not recover a CBR clock, but only generates a phase discrimination value and refreshes a compensation value, and a received end finally recovers the CBR clock, so that a noise can be controlled to be related to only a noise of a transmit end and a noise of the receive end, and unrelated to cascaded intermediate devices. Therefore, a noise can still be relatively small in a case in which a plurality of cascaded intermediate devices are traversed, thereby greatly improving a cascading capability; and a relatively high bandwidth can be achieved, thereby improving a system tracking capability.

To make a person skilled in the art understand the technical solutions in this application better, the following clearly describes the technical solutions in various embodiments with reference to the accompanying drawings in the embodiments of this application. Apparently, the described embodiments are merely some rather than all embodiments. Detailed descriptions are separately provided below.

In the specification, claims, and accompanying drawings of this application, the terms "first", "second", "third", "fourth", and the like (if existent) are intended to distinguish between similar objects but do not necessarily describe a specific order or sequence. It should be understood that the data termed in such a way is interchangeable in proper circumstances, so that the embodiments described herein can be implemented in an order other than the order illustrated or described herein.

Figure 1:
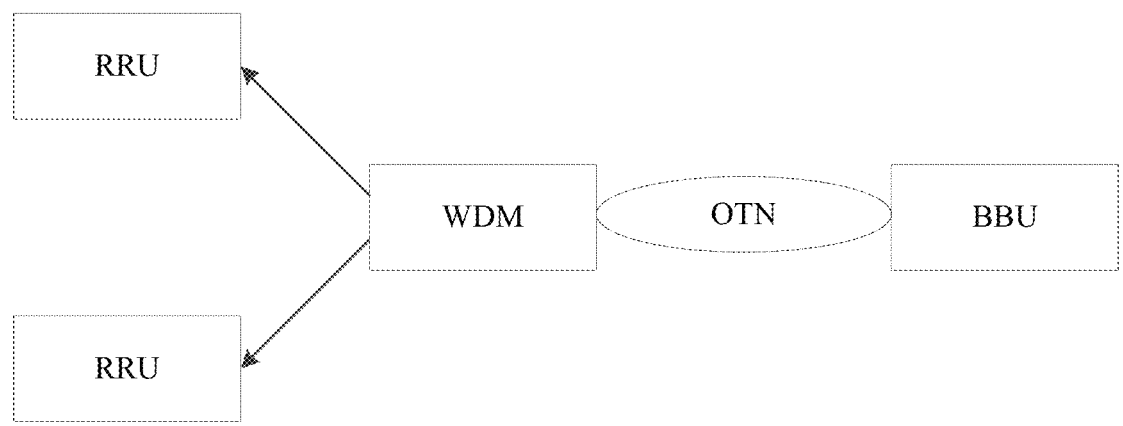
FIG. 1 is a schematic diagram of a network architecture of a wireless fronthaul application scenario according to this application.
Figure 2:
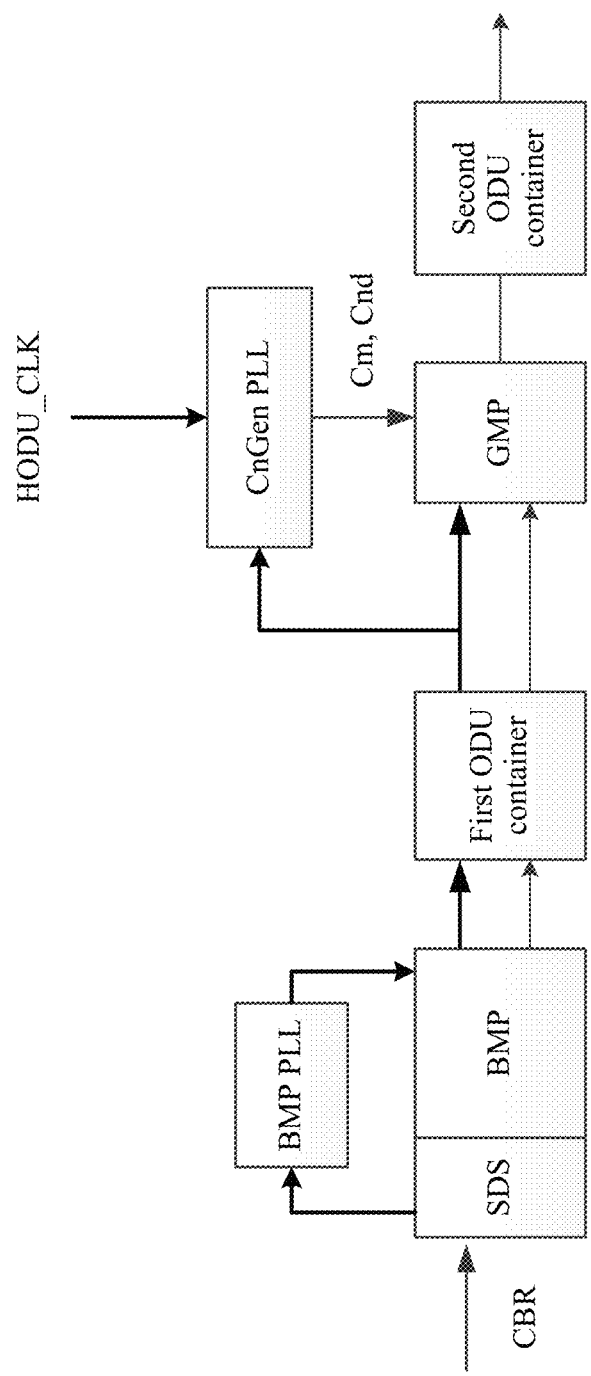
FIG. 2 is a schematic processing diagram of a transmitter.
Figure 3:
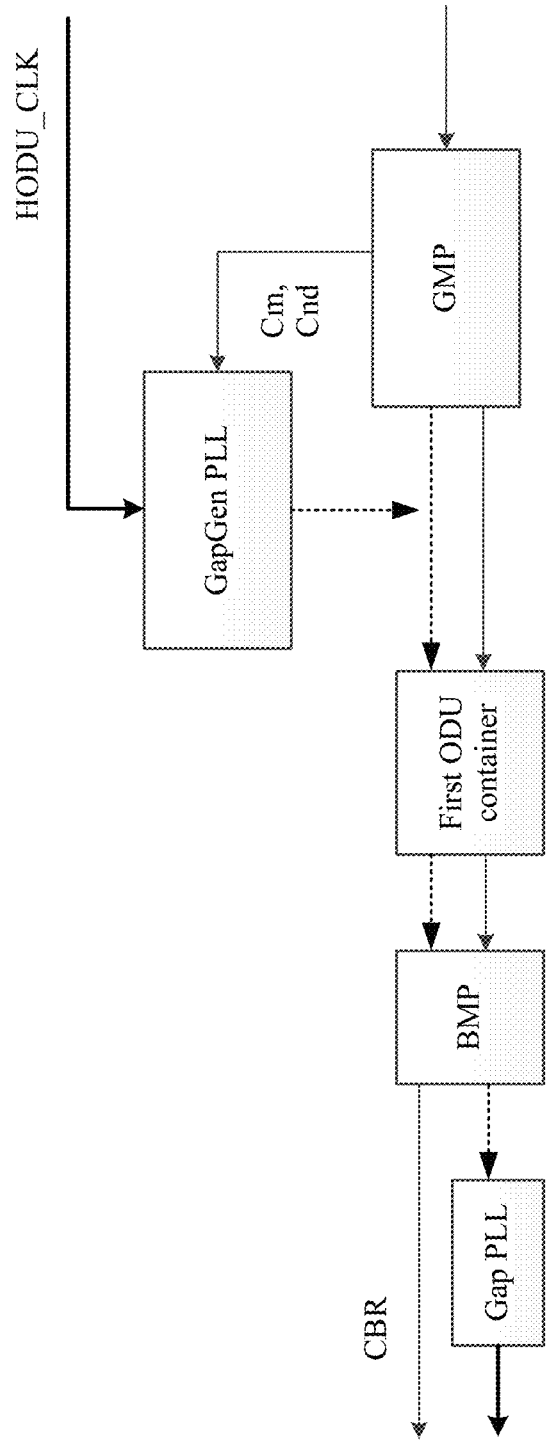
FIG. 3 is a schematic processing diagram of a receiver.

The following describes CBR service transmission. FIG. 2 is a schematic processing diagram of a transmitter, and FIG. 3 is a schematic processing diagram of a receiver. In FIG. 2, a thick line indicates a clock processing procedure, a thin line indicates a service processing procedure, and HODU_CLK represents an ODU clock of the transmitter. A main processing process of the transmitter is as follows: First, a CBR service is encapsulated into a first ODU container through a Bit-synchronous Mapping Procedure (BMP), and in this process, service rate adaptation is implemented based on a synchronization relationship between a service clock of the first ODU container and a service clock of the CBR service. Then, when the first ODU container is mapped into a second ODU container through a GMP (where the second ODU container has a higher rate than the first ODU container), first, a Cn feedback module (for example, a CnGen phase-locked loop (PLL) feedback calculation loop), is used to calculate customer signal byte information Cm and remaining customer signal information Cnd that are included in a frame period, where Cm may represent a parallelism degree of customer signal mapping, Cnd represents a quantity of customer signals that are remained after a total quantity of customer signals are mapped in one frame period based on the parallelism degree, and Cnd and Cm may represent an overhead field of a rate ratio of the first ODU container to the second ODU container; and then, Cnd and Cm are switched and inserted into an overhead of the second ODU container, and service rate adaption is implemented by inserting invalid data STUFF into a payload area of the second ODU container. In FIG. 3, a thick line indicates a clock processing process, a thin line indicates a service processing process, a dashed line indicates a gap clock processing process, and HODU_CLK represents an ODU clock of the receiver. After receiving the second ODU container, the receive end identifies valid data and the invalid data STUFF in the payload area based on Cm and Cnd in the overhead, and transmits the invalid data in a selective shielding manner, to implement full recovery of the first ODU container. Then, a GapGen PLL feedback calculation loop (used to generate a gap clock) of the receive end generates a relatively even gap clock based on the ODU clock, Cm, and Cnd that are obtained from the second ODU container, to match a transmission rate difference between the first ODU container and second ODU container. Finally, the CBR service is recovered through the BMP, and simultaneously the gap clock is recovered to a normal CBR clock by using a Gap PLL.

Figure 4:
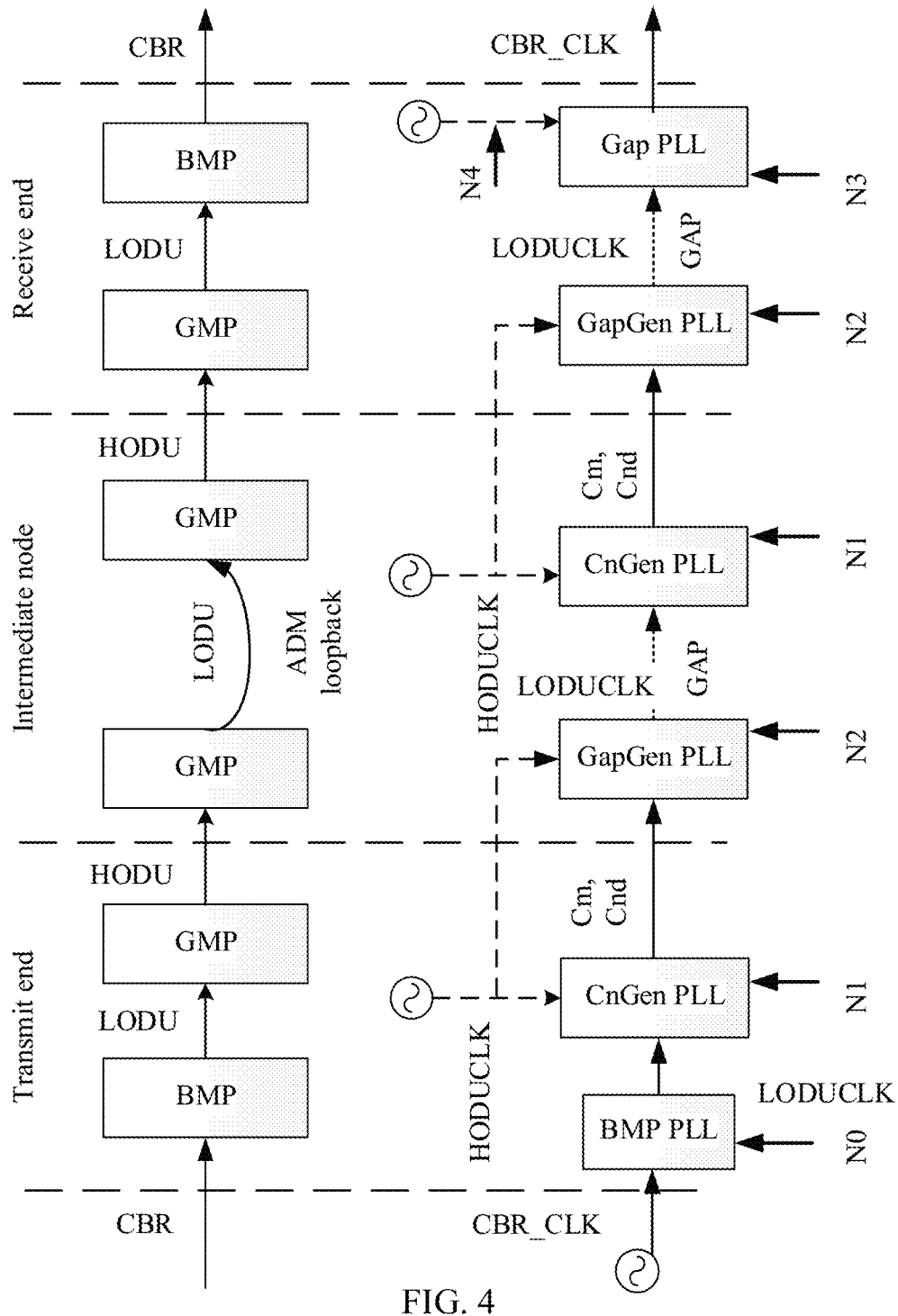
FIG. 4 is a schematic diagram in which a CBR service traverses an OTN network.

The following describes various noises that are caused in the foregoing process. FIG. 4 is a schematic diagram in which a CBR service traverses an OTN network. LODU represents a first ODU container, HODU represents a second ODU container, ADM is used for an add/drop multiplexing process, thin solid lines in the upper part indicate a traversing process of the CBR service, sparse dashed lines in the lower part indicate processing processes of an ODU clock of a transmit end, an ODU clock of an intermediate node, and a CBR clock of a receive end, and thin dashed lines indicate a processing process of a gap clock that is generated though a GMP. A service processing link over which the CBR service traverses the OTN network is from the transmit end to the intermediate node and then to the receive end. Specifically, the CBR service is encapsulated into the first ODU container, and then into the second ODU container, to complete a process of the transmit end. Then, the intermediate node decapsulates the second ODU container to obtain the first ODU container, and then encapsulates the first ODU container into the second ODU container again after ADM is completed, to complete a process of the intermediate node. Certainly, if there are a plurality of intermediate nodes cascaded, the processing process of the intermediate node is cycled. Finally, the receive end decapsulates the second ODU container to obtain the first ODU container, and then recovers the CBR service from the first ODU container. In this process:

N0 represents an adjustment noise of a PLL in a BMP process, where the adjustment noise may be filtered by a low bandwidth filter of a next-hop PLL and therefore may be ignored;

N1 represents a noise introduced by a CnGen PLL loop in a GMP mapping process, where the noise is in an order of magnitude of 0.1 ns, and may accumulate at an equal ratio along a cascading path;

N2 represents a noise introduced by a GapGen PLL loop in a GMP demapping process, where the noise is in an order of magnitude of 2 ns, and may accumulate at an equal ratio along a cascading path;

N3 represents a phase discrimination quantizing noise of a GAP PLL, where the phase discrimination quantizing noise is in an order of magnitude of 2 ns, generated at a last hop, and unrelated to a cascading hop count; and N4 represents a local VCO noise of the GAP PLL, where the local VCO noise has a feature of high pass, and the noise cannot be ignored because the GAP PLL loop uses a relatively low bandwidth.

The CnGen PLL and the GapGen PLL usually use a same loop bandwidth, and typically, the same loop bandwidth may be 1 KHz.

Figure 5:
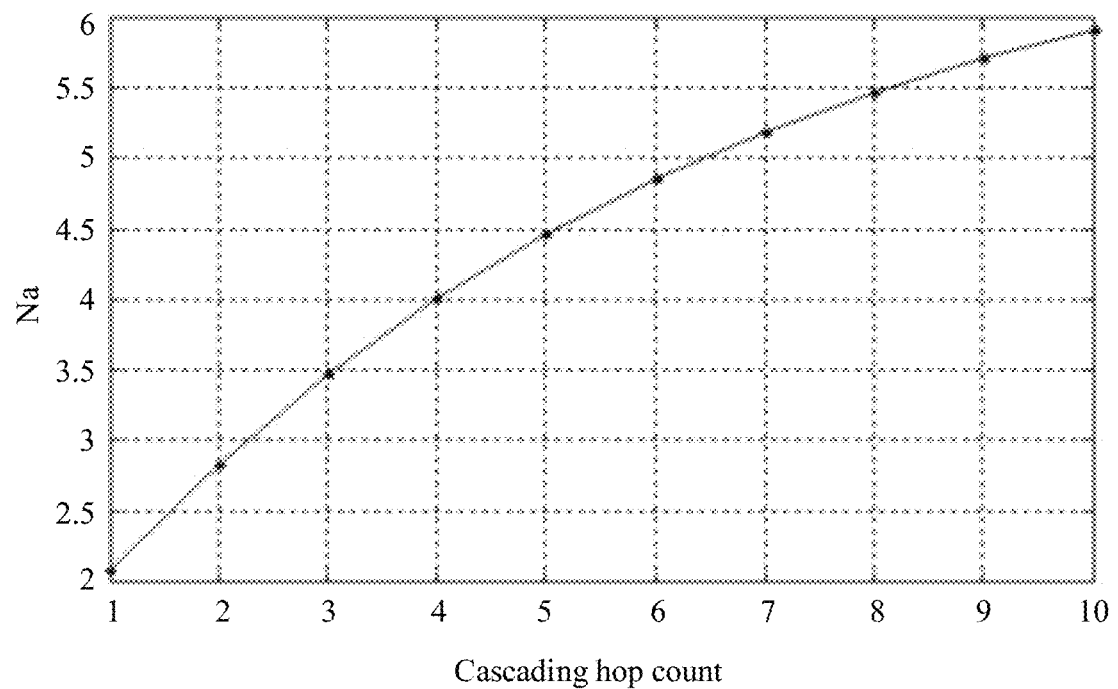
FIG. 5 is a schematic diagram of impact of a cascading hop count on system performance.

An end-to-end noise of the entire link is as follows:

$$N_a = (N1+N2) \cdot (1-g_{gen}{}^n)/(1-g_{gen}) \cdot g_{gappll} + N3 \cdot g_{gappll} + N4 \cdot (1-g_{gappll})$$

n represents a hop count, $g_{gen}$ represents loop gains of the CnGen PLL and the GapGen PLL in the GMP (a same bandwidth is usually set for the two PLLs), and $g_{gappll}$ represents a tail end phase-locked loop gain and is related to only N3 and N4 that are generated by the receive end. It may be learned from the formula that a larger cascading hop count n indicates a larger link noise. For details, refer to FIG. 5. FIG. 5 is a schematic diagram of impact of a cascading hop count on system performance. In addition, because a phase-locked loop of the receive end needs to use an ultra-low bandwidth, to reduce a performance degrading effect that is introduced by the noises N1, N2, and N3, a tracking capability of the loop is weak. In addition, a phase-locked loop tuning crystal oscillator of the receive end needs to be a high-performance controlled crystal oscillator, to alleviate performance degrading that is introduced by N4. A lateral axis represents a cascading hop count, namely, a quantity of intermediate nodes, and a longitudinal axis represents jitter that is of a phase difference between a CBR clock recovered at the tail end and an initial CBR clock and that is generated by a plurality of cascaded intermediate nodes, namely, theoretically, a jitter amplitude of a clock noise of the entire link, where a unit of the jitter is nanosecond.

In view of this, an embodiment provides a method for implementing an OTN network-based CBR service. In the method, a noise of an entire link is unrelated to cascaded intermediate device hop count, and therefore the noise is related to only a transmit end and a receive end.

Figure 6A:
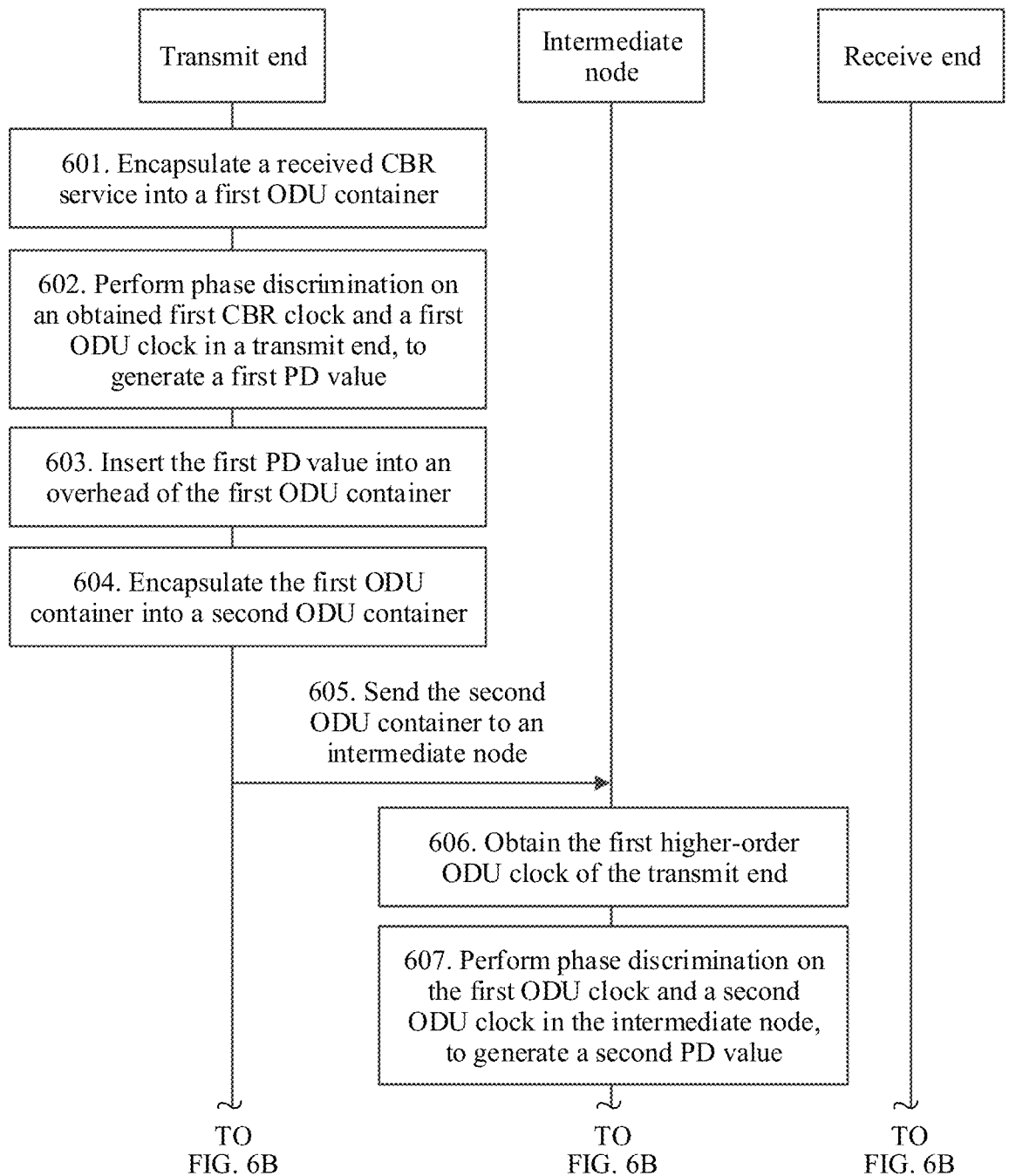
FIG. 6A and FIG. 6B are a schematic diagram of a clock transmission method according to an embodiment of this application.
Figure 6B:
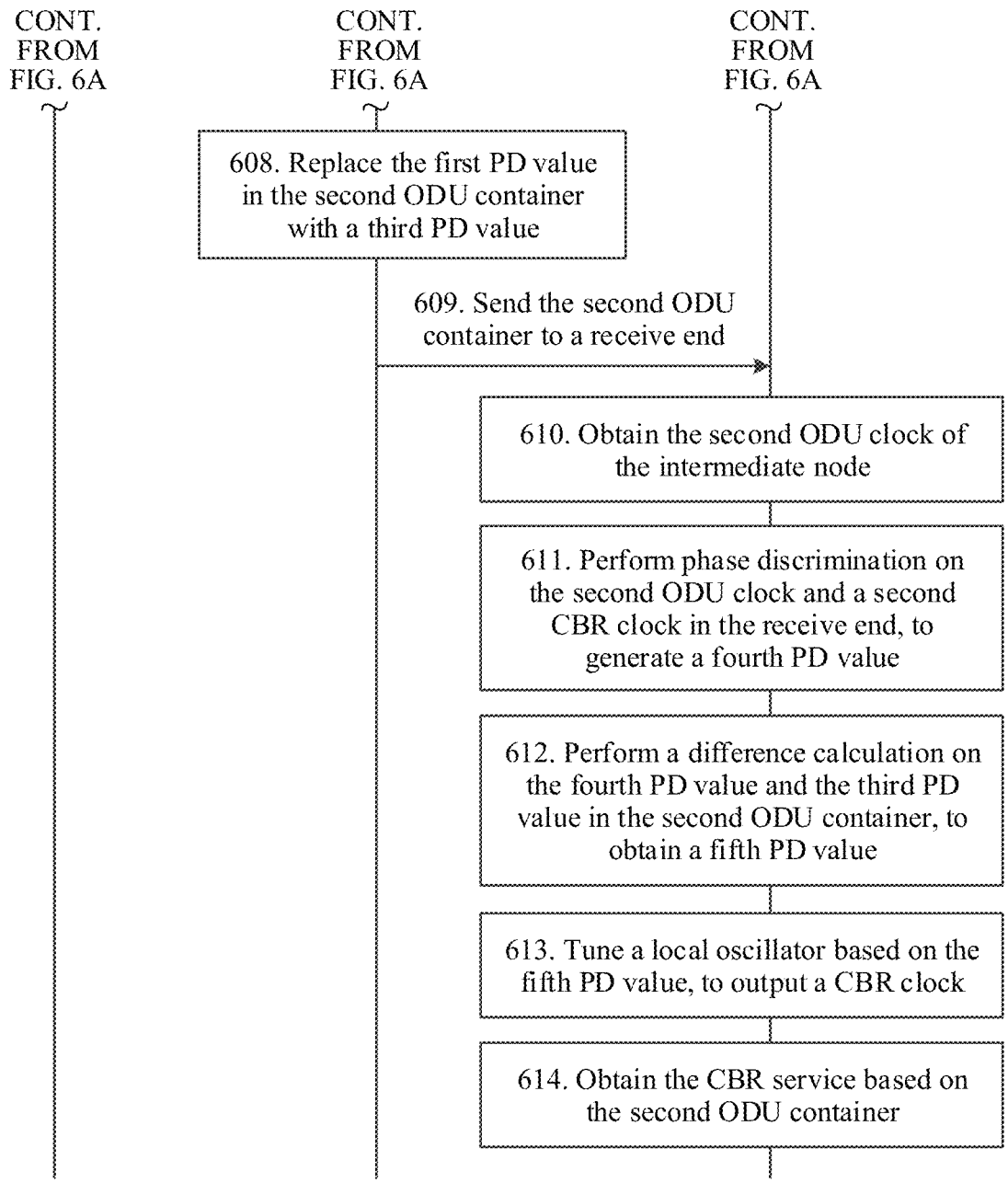
Figure 7A:
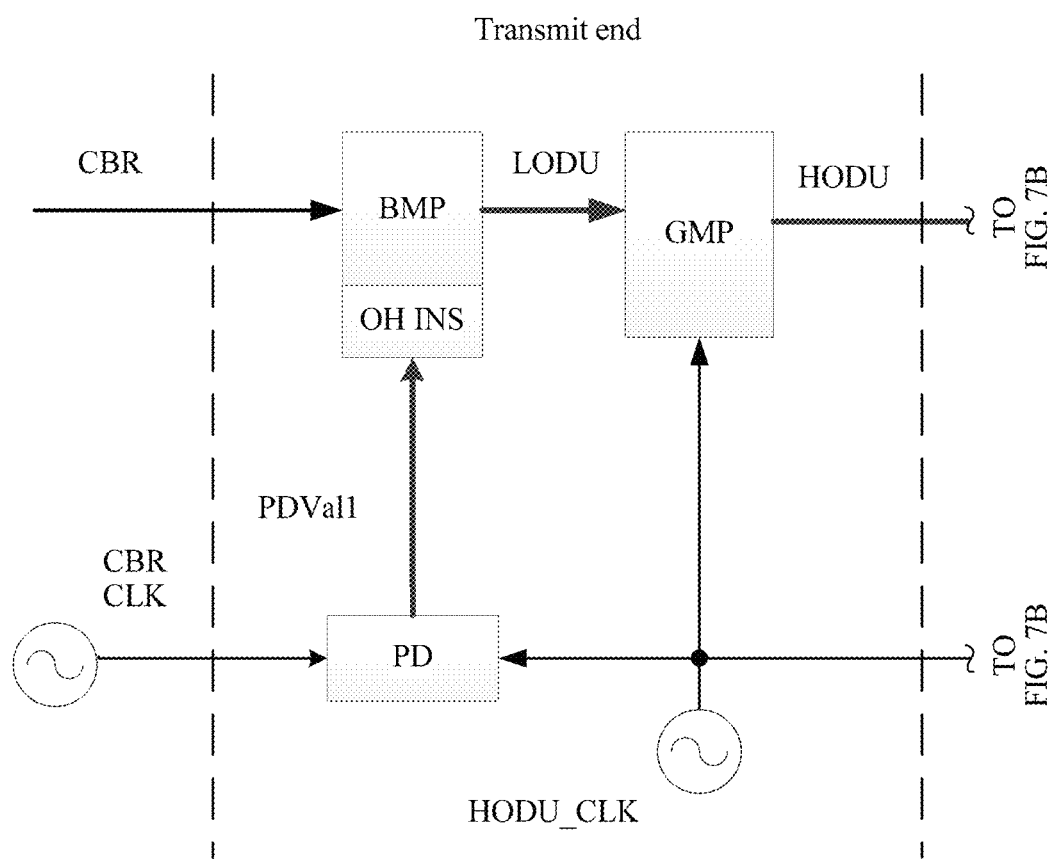
FIG. 7A, FIG. 7B, and FIG. 7C are another schematic diagram of a clock transmission method according to an embodiment of this application.
Figure 7B:
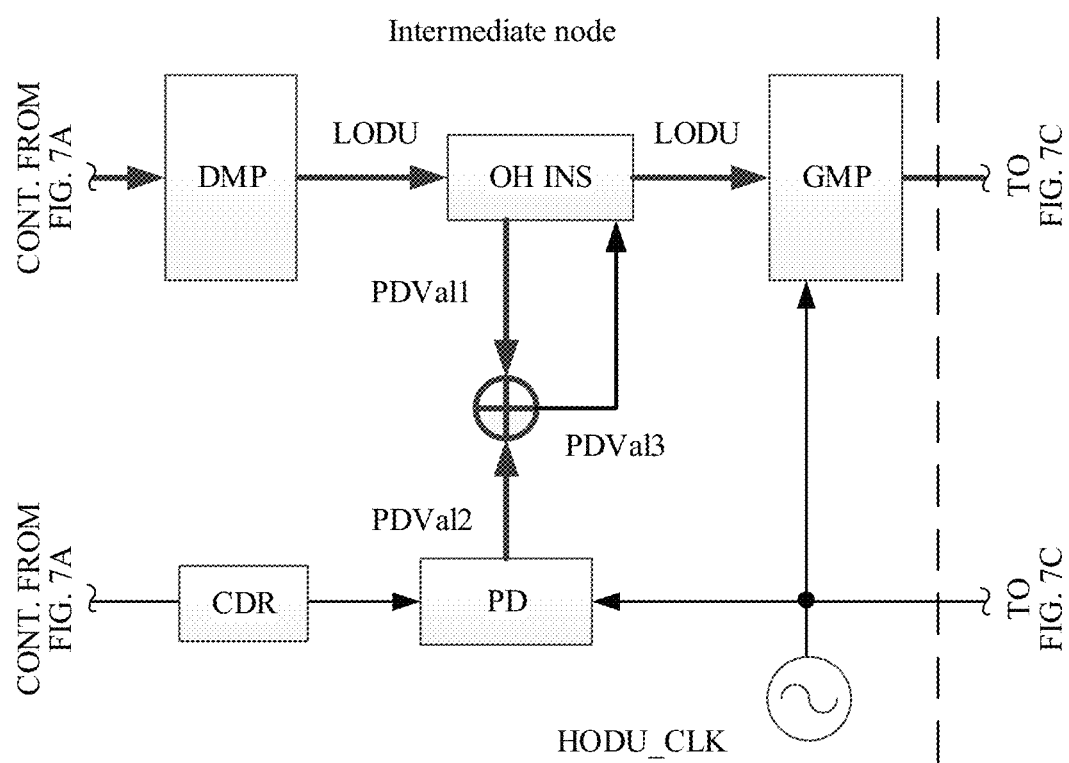
Figure 7C:
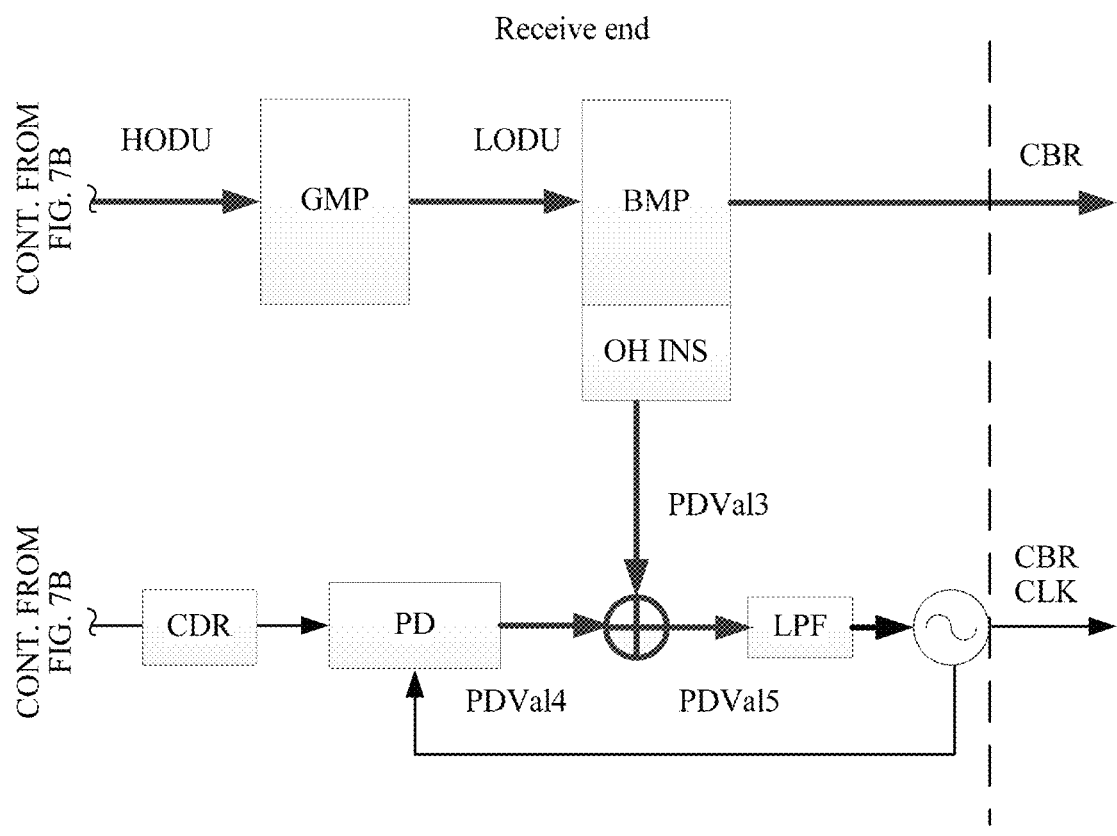

FIG. 6A and FIG. 6B are a schematic diagram of a clock transmission method according to an embodiment of this application, and FIG. 7A, FIG. 7B, and FIG. 7C are another schematic diagram of a clock transmission method according to an embodiment of this application. In the method, one intermediate node is used as an example, and an example in which a transmission service, more specifically, a CBR service, is encapsulated into a first ODU container is used. Certainly, the transmission service may not be transmitted, and only invalid data is added for rate matching. There may be no association relationship between the transmission service and a first clock. Certainly, the first clock may be a clock (for example, a CBR clock corresponding to the CBR service) recovered from the transmission service. A case in which a plurality of intermediate devices are cascaded may be deduced from this. In this case, the method may include the following steps.

601. A transmit end encapsulates a received CBR service into a first ODU container.

The transmit end encapsulates the CBR service of a customer side, and also obtains, from the customer side, a first CBR clock of the CBR service in an encapsulation process. In the process, a customer signal in the CBR service is mapped into the first ODU container in a BMP manner.

602. The transmit end performs phase discrimination on an obtained first CBR clock and a first ODU clock in the transmit end, to generate a first PD value.

It should be noted that there is no fixed sequence relationship between step 601 and step 602.

In a process of encapsulating the first ODU container, phase discrimination is performed on the first CBR clock from the customer side and the first ODU clock in the transmit end, to generate the first PD value. The first ODU clock is generated after a component in the transmit end freely runs. In a phase discrimination process, a phase detector outputs different voltage signals based on a phase difference between two different input signals, and the voltage signals can reflect the phase difference between the two input signals.

603. The transmit end inserts the first PD value into an overhead of the first ODU container.

After the first PD value is generated, the value is inserted into the overhead of the first ODU container. The first PD value can reflect a relationship between the first CBR clock and the first ODU clock, and therefore is applied to a difference calculation process of an intermediate node. Referring to FIG. 7A, the first CBR clock is CBR CLK of the transmit end, the first ODU clock is HODU_CLK of the transmit end, and the first PD value is PDval1 of the transmit end.

604. The transmit end encapsulates the first ODU container into a second ODU container.

After the first PD value is inserted, the first ODU container is encapsulated into the second ODU container, and the second ODU container is sent to the intermediate node. In a process in which the first ODU container is mapped to the second ODU container, a problem that a rate of the first ODU container does not match a rate of the second ODU container may also occur. A GMP mapping manner or a manner of inserting invalid data STUFF into a payload area of the second ODU container may be used to implement rate adaption between the two containers.

It should be noted that the rate of the second ODU container is higher than the rate of the first ODU container. A rate of an ODU container includes at least four levels: 2.488 G of an ODU1 level, 9.995 G of an ODU2 level, 40.149 G of an ODU3 level, and 104.134 G of an ODU4 level. If the first ODU container is at the ODU1 level, the second ODU container may be at the ODU2 level; or if the first ODU container is at the ODU2 level, the second ODU container may be at the ODU3 level. Certainly, the second ODU container may be at two levels higher than the first ODU container. Division of ODU rate levels is not limited to only the foregoing levels, and more levels may be obtained through division based on different rates.

605. The transmit end sends the second ODU container to an intermediate node.

Then, the second ODU container is sent to the intermediate node, to complete a service processing process of the transmit end.

606. The intermediate node obtains the first ODU clock of the transmit end.

After the transmit end completes processing of the CBR service, the intermediate node receives the second ODU container sent by the transmit end, and the intermediate node also obtains the first ODU clock of the transmit end. A manner of obtaining the first ODU clock may be recovering the first ODU clock of the transmit end from the second ODU container through CDR (CDR, clock and data recovery).

In high-speed data communication such as optics communication, usually only a data signal is transmitted, but a clock signal that is synchronized with the data signal is not transmitted. This manner can reduce an overhead while an extra clock signal transmission channel does not need to be set. However, in a case of using this manner, time sequence information such as a clock needs to be able to be extracted from data, to ensure synchronous data processing of a data receive end. The clock is a clock carried in a transmit end, and the clock can be used to resample data, to recover an original data signal in a standardized waveform, thereby eliminating a jitter accumulated in a data transmission process. In a CDR technology, a CDR receiver needs to be able to recover an embedded clock from data, in other words, obtain the clock from data signal exchanging. A specific clock recovery process of the CDR technology may be as follows: A CDR transmitter first sends data in serials, and then converts the data into an 8b/10b coding scheme in which 8-bit data is obtained through coding processing and is converted into a 10-bit symbol. In the 8b/10b coding manner, a same quantity of 0 and 1 may be transmitted in a data line, to alleviate intercode interference and provide sufficient data edges, so that the CDR receiver locks a phase in a received data stream. The transmitter multiplies a frequency of a system clock to reach a transfer bit rate, and sends 8b/10b data on a differential pair of a transmit side at the rate. Then, the CDR receiver first locks a phase on a differential bit stream of a receive side, and then can obtain a clock embedded into the data. In a CDR system, a transmit system and a receive system usually have totally independent system clocks. The two clocks are very critical in a particular changing range, and the range is approximately hundreds of PPMs.

CDR structures may be generally divided into three types: a feedforward (feedforward) phase tracking type, a feedback (feedback) phase tracking type, and a (non-phase tracking) blind-oversampling (blind-oversampling) type, based on a phase relationship between a local clock and data during data recovery and different implementations of the phase relationship.

In CDR of the feedforward phase tracking CDR type, (during sampling determining) a phase relationship between a local clock and input data is ensured through constant feedforward, calibration, and tracking of clock information and a refined delay match design in a circuit and layout design phase. In CDR of the feedback phase tracking type, (during sampling determining) a phase relationship between a local clock and input data is ensured by a phase detector (Phase Detector) by monitoring a change of a relative phase between the local clock and the data in real time, and feeding back the change to a control circuit in real time to perform phase calibration. PDs of this type all include a data sampling determining function, and therefore an extra data sampling determining circuit usually is not needed. Blind-oversampling CDR is an oversampling technology in which a sampling clock (a frequency and a phase) is determined and unchanged, and is not controlled or affected by input data (feedforward) or a subsequent detection circuit (feedback). In this technology, clock and data information are specifically obtained by a subsequent circuit by performing determining and identifying according to an algorithm and based on a large quantity of sampling samples obtained through oversampling.

In this embodiment of this application, the feedforward phase tracking type or the feedback phase tracking type may be used to recover clock data. PLL-type CDR can be used both in the two manners. A core of this type of CDR technology is a PLL, and the PLL includes a phase detector, a low-pass filter (LFP, Low-Pass Filter), a voltage controlled oscillator (VCO, voltage controlled oscillator), and a frequency divider. The VCO is an oscillation circuit in which there is a correspondence between an output frequency and an input control voltage. The frequency divider is configured to provide the PD with an input frequency that can be used for comparison, and then low-pass filtering is performed on a signal that is output by the phase detector. Then, the voltage controlled oscillator outputs a signal of a corresponding frequency, namely, a recovered clock, based on an input control voltage, and resamples data by using the recovered clock, to recover original data.

607. The intermediate node performs phase discrimination on the first ODU clock and a second ODU clock in the intermediate node, to generate a second PD value.

After recovering the first ODU clock by using the second ODU container, the intermediate node performs phase discrimination on the first ODU clock and the second ODU clock in the intermediate node, to obtain the second PD value.

608. The intermediate node replaces the first PD value in the second ODU container with a third PD value, where the third PD value is obtained after a difference calculation is performed on the first PD value and the second PD value.

Then, after obtaining the second PD value, the intermediate node performs the difference calculation on the second PD value and the first PD value, to obtain the third PD value. The first PD value is obtained after phase discrimination is performed on the first CBR clock and the first ODU clock, and the second PD value is obtained after phase discrimination is performed on the second ODU clock and the first ODU clock, and therefore the third PD value that is obtained through the difference calculation reflects a phase relationship between the second ODU clock and the first CBR clock. In addition, both the first ODU clock of the transmit end and the second ODU clock of the intermediate node are used to encapsulate the second ODU container in a GMP mapping process, and therefore a corresponding ODU clock can be obtained by performing CDR on a corresponding second ODU container. Referring to FIG. 7B, the first PD value is PDVal1 of the intermediate node, the second PD value is PDVal2, the third PD value is PDval3, the second ODU clock is HODU_CLK of the intermediate node, and the first ODU clock is a clock that is recovered by the intermediate node through CDR.

609. The intermediate node sends the second ODU container to a receive end.

After a process of replacing the first PD value in the second ODU container with the third PD value, the second ODU container is sent to the receive end.

Step 606 to step 609 are steps performed by one intermediate node. Actually, in a case of a plurality of intermediate nodes, for example, step 606 to step 609 are performed by a first intermediate node, and a second intermediate node is connected subsequently to the first intermediate node. In this case, the second intermediate node uses the first intermediate node as a "transmit end" to perform step 606 to step 609 again, to be specific, perform a difference calculation on the PD value in the second ODU container and a PD value that is obtained after phase discrimination is performed on the ODU clock of the first intermediate node and an ODU clock of the second intermediate node, to obtain a difference, and replacing the previous PD value in the second ODU container with the difference. It may be understood that, when there are a plurality of intermediate nodes, each intermediate node performs the foregoing operation, to "ignore" an ODU clock of a previous-hop intermediate node. In other words, the PD value has no association relationship with the ODU clock of the previous-hop intermediate node.

610. The receive end obtains the second ODU clock of the intermediate node.

The receive end recovers the second ODU clock from the received second ODU container through CDR, and use the second ODU clock to perform GMP decapsulation, to obtain the first ODU container. Referring to FIG. 7C, the second ODU clock is a clock that is recovered by the receive end through CDR.

611. The receive end performs phase discrimination on the second ODU clock and a second CBR clock in the receive end, to generate a fourth PD value.

After recovering the second ODU clock of the intermediate node, the receive end performs phase discrimination on the second ODU clock and the second CBR clock in the receive end, to obtain the fourth PD value. The third PD value reflects the phase relationship between the second ODU clock and the first CBR clock, and the fourth PD value is obtained after phase discrimination is performed on the second CBR clock of the receive end and the second ODU clock.

612. The receive end performs a difference calculation on the fourth PD value and the third PD value in the second ODU container, to obtain a fifth PD value.

Then, the fifth PD value that is obtained after the difference calculation is performed on the third PD value and the fourth PD value reflects a relationship between the first CBR clock and the second CBR clock. If the first CBR clock and the second CBR clock are in a synchronous state, the fifth PD value is 0, in other words, the third PD value is equal to the fourth PD value. When the fifth PD value is not 0, the second CBR clock needs to be adjusted. The fifth PD value is used to determine a correspondence between the two clocks. Then, the second CBR clock is adjusted as the first CBR clock, and the first CBR clock is output. This successively recovers the first CBR clock after the first CBR clock traverses an entire network. In addition, during final recovery, only the relationship between the first CBR clock and the second CBR clock is used for recovery, and therefore there is no relationship between performance recovery and the intermediate node. Therefore, some cascaded intermediate nodes can be ignored. Referring to FIG. 7C, the third PD value is PDVal3 of the receive end, the fourth PD value is PDVal4 of the receive end, and the fifth PD value is PDVal5 of the receive end.

613. The receive end tunes a local oscillator based on the fifth PD value, to output a CBR clock.

After the fifth PD value is generated, the local oscillator is tuned based on the fifth PD value, to output the CBR clock. It may be understood that if the fifth PD value is 0, the first CBR clock is the same as the second CBR clock, and it is equivalent that an output value is the first CBR clock. However, if it is found that the fifth PD value is not 0, the local oscillator needs to be adjusted based on the fifth PD value, to re-output a second CBR clock, so that the re-output second CBR clock is the same as the first CBR clock. This completes a clock recovery process of the CBR service. A low-pass filter is further used to filter a noise for the clock that is tuned by using the fifth PD value, to finally output the first CBR clock. Referring to FIG. 7C, the first CBR clock is CBR CLK of the receive end.

614. The receive end obtains the CBR service based on the second ODU container.

This embodiment uses a scenario in which both the CBR service and the clock are transmitted, and therefore after the clock recovery of the CBR service is completed, the second ODU container is simultaneously decapsulated to the first ODU container, and then the first ODU container is demapped to obtain the CBR service. This completes a process in which the CBR service traverses the OTN network.

It should be noted that the foregoing steps are corresponding to the scenario in which both the CBR service and the CBR clock are transmitted. However, two types may be obtained through division in this application. In one type, only the clock is transmitted, and an ODU container in a transmission process may be stuffed with invalid data to meet a transmission protocol of the OTN network. In the other type, both the clock and the service are transmitted. Certainly, the service and the clock may match each other, or the service and the clock may not match. For example, the clock is a clock of a service A, but a service B is transmitted. The foregoing embodiment shows the scenario in which both the service and the clock are transmitted, and the service and the clock match each other.

In the foregoing traversal process, if both a clock noise of the first ODU clock of the transmit end and a noise of the second ODU clock of the intermediate node are considered as $N_1$, a noise of the second CBR clock of the receive end, namely, a noise of a clock that is generated by the low-pass filter and the local oscillator is considered as $N_2$, and $N_c$ is a noise caused in all phase discrimination processes, a noise model formula of an entire link may be:

$$N_a = (N_1 + (N_1 - H_{cdr} \cdot H_1) \cdot n) \cdot H_{serv\_lp} + N_2 \cdot H_{serv\_hp} = (N_1 + N_1) \cdot (1 - H_{cdr}) \cdot n) \cdot H_{serv\_lp} + N_2 \cdot H_{serv\_hp}$$

n represents a cascading hop count of intermediate nodes, in other words, it is equivalent that the CBR service needs to traverse n intermediate nodes before reaching the receive end. $H_{cdr}$ a transfer function in a CDR process, and has a relatively high bandwidth of more than 10 KHz. Noises accumulate after a plurality of CDR processes. $H_{serv\_lp}$ and $H_{serv\_hp}$ respectively represent a low-pass transfer function and a high-pass transfer function of a recovery loop of a CBR clock (namely, the second CBR clock) of a last-hop device, and a bandwidth in the process is selected as 20 Hz to 100 Hz. Phase detectors used in all the phase discrimination processes all have ps-level high precision, and therefore noises generated by the phase detectors can be ignored.

Therefore, in a case of a noise energy of 0 KHz to 10 KHz, $H_{cdr} \approx 1$, and in this case, the foregoing formula may be simplified as $N_a = N_1 H_{serv\_lp} + N_2 \cdot H_{serv\_hp}$. It may be learned that in this case, the noise of the entire link is related to only the noise generated by the first ODU clock of the transmit end and the noise of the generated second CBR clock. For an energy of more than 10 KHz, a noise generated by a previous-hop device attenuates due to low pass of $H_{serv\_lp}$, and therefore the noise can be ignored after the noise attenuates. Therefore, finally, the noise of the entire link is related to only the noise of the generated second CBR clock, but is unrelated to the transmit end and the intermediate node. However, a noise caused in a process of traversing the intermediate node can be ignored regardless of a case, so that a problem of the cascading hop count does not need to be considered in a process in which the CBR service traverses the OTN network. In addition, the intermediate node does not recover the clock of the CBR service, and does not cause a corresponding noise, and the noise generated by the second ODU container of the intermediate node can be ignored. Therefore, CBR service processing is separated from clock recovery processing. This resolves a performance degrading problem that is caused when the CBR service traverses a multi-hop OTN network. In addition, a relatively high bandwidth can be used to filter a noise in a process in which the receive end recovers the clock of the CBR service, so that a tracking capability of a system can be enhanced.

Figure 8:
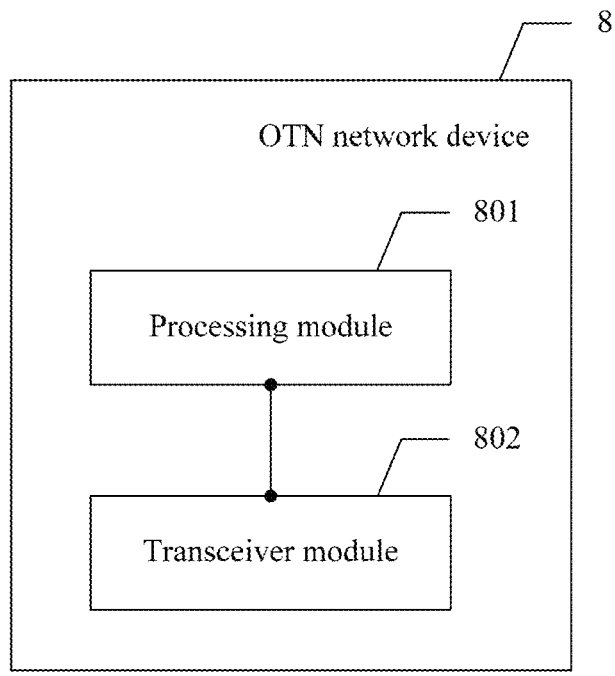
FIG. 8 is a schematic diagram of an OTN device according to an embodiment of this application.

The foregoing describes the clock transmission method in the embodiments of this application, and the following describes a related OTN device in the embodiments of this application. First, an OTN device that is used as a transmit end is described. FIG. 8 is a schematic diagram of an OTN device 8 according to an embodiment of this application. The OTN device 8 includes:

a processing module 801, configured to: obtain a first ODU container, and further perform phase discrimination on an obtained first clock and a first ODU clock of the OTN device 8, to generate a first PD value; then insert the first PD value into an overhead of the first ODU container; and finally, encapsulate the first ODU container into a second ODU container, where a rate of the second ODU container is higher than a rate of the first ODU container; and a transceiver module 802, configured to send the second ODU container.

The processing module 801 can implement step 601 to step 604 in the embodiment shown in FIG. 6A. The transceiver module 802 can implement step 605 in the embodiment shown in FIG. 6A.

In some embodiments, the transceiver module 802 is further configured to receive a transmission service, and in this case, the processing module 801 is specifically configured to encapsulate the received transmission service into the first ODU container. For specific implementation processes of the transceiver module 802 and the processing module 801, refer to the embodiment shown in FIG. 6A. Details are not described herein again.

In some embodiments, the processing module 801 is further configured to recover the first clock from the transmission service. It may be learned that this process shows a scenario in which both the service and the clock are transmitted, and there is an association relationship between the clock and the service.

In some embodiments, the transmission service is a CBR service, and the processing module 801 is specifically configured to encapsulate the received CBR service into the first ODU container through a BMP. It may be learned that the transmission service is actually the CBR service. Therefore, the associated clock is a CBR clock, and the processing module 801 can directly encapsulate the CBR service into the first ODU container during encapsulation.

Figure 9:
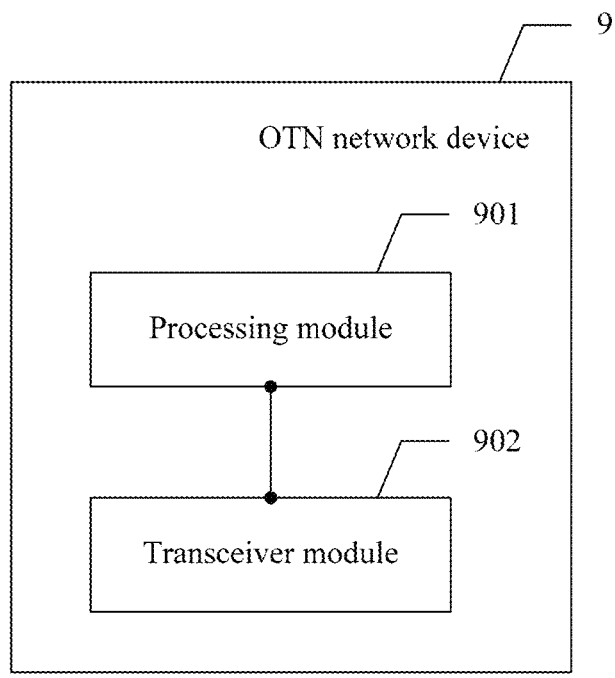
FIG. 9 is a schematic diagram of an OTN device according to an embodiment of this application.

Then, an OTN device that is used as an intermediate node is described. FIG. 9 is a schematic diagram of an OTN device 9 according to an embodiment of this application. The OTN device 9 includes:

a transceiver module 902, configured to receive a second ODU container; and a processing module 901, configured to: obtain a first ODU clock of the second ODU container; then perform phase discrimination on the first ODU clock and a second ODU clock of the OTN device 9, to obtain a second PD value; and finally, replace a first PD value in the second ODU container with a third PD value, where the third PD value is obtained after a difference calculation is performed on the first PD value and the second PD value, the first PD value is obtained after phase discrimination is performed on a first clock and the first ODU clock, and the first clock is obtained by a generation end that generates the first PD value.

The transceiver module 902 is further configured to send a target ODU container bearing the third PD value, where a rate of the target ODU container is not lower than a rate of a first ODU container that is in the second ODU container and that bears the first PD value, and the rate of the first ODU container is lower than a rate of the second ODU container.

The processing module 901 can implement step 606 to step 608 in the embodiment shown in FIG. 6A and FIG. 6B. The transceiver module 902 can implement step 609 in the embodiment shown in FIG. 6B.

In some embodiments, the processing module 901 is specifically configured to encapsulate the second ODU container into a third ODU container, where a rate of the third ODU container is higher than the rate of the second ODU container; and in this case, the transceiver module is specifically configured to send the third ODU container bearing the third PD value.

It may be learned that in a transmission process of this case, the second ODU container is encapsulated into the higher-level third ODU container.

In some embodiments, the processing module 901 is specifically configured to: decapsulate the second ODU container to obtain the first ODU container through a GMP; perform the difference calculation on the first PD value in the first ODU container and the second PD value, to obtain the third PD value; replace the first PD value in the first ODU container with the third PD value; and encapsulate the first ODU container bearing the third PD value into the second ODU container.

For a specific process in which the processing module 901 replaces the first PD value with the third PD value, refer to step 608 in the embodiment shown in FIG. 6B. Details are not described herein again.

Figure 10:
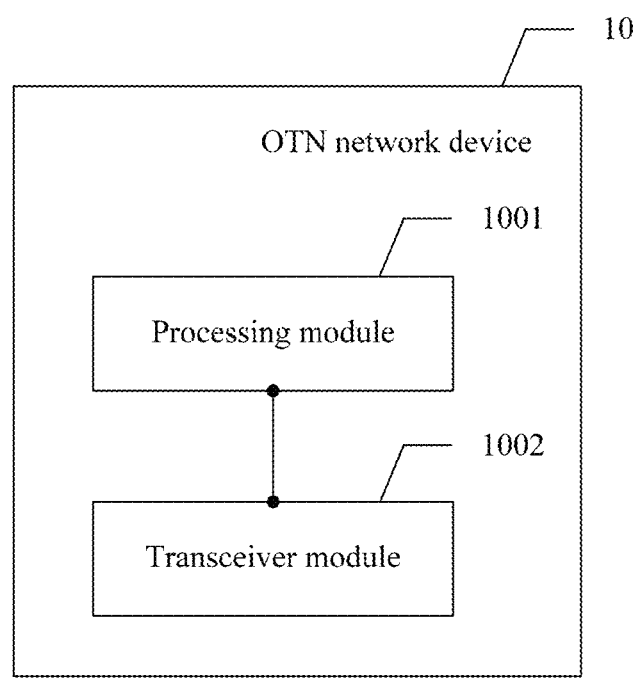
FIG. 10 is a schematic diagram of an OTN device according to an embodiment of this application.

Finally, an OTN device that is used as a receive end is described. FIG. 10 is a schematic diagram of an OTN device 10 according to an embodiment of this application. The OTN device 10 includes:

a transceiver module 1002, configured to receive a second ODU container; and a processing module 1001, configured to: obtain a second ODU clock of the second ODU container; then perform phase discrimination on the second ODU clock and a second clock of the OTN device 10, to generate a fourth PD value; then perform a difference calculation on the fourth PD value and a third PD value borne in the second ODU container, to obtain a fifth PD value, where the third PD value is obtained after a difference calculation is performed on a first PD value and a second PD value, the second PD value is generated after phase discrimination is performed on a first ODU clock and the second ODU clock, the first PD value is obtained after phase discrimination is performed on a first clock and the first ODU clock, the first ODU clock is an ODU clock of a generation end of the first PD value, and the first clock is obtained by the generation end; and finally, adjust the second clock as the first clock based on the fifth PD value, and output the first clock.

The processing module 1001 can implement step 610 to step 614 in the embodiment shown in FIG. 6B. The transceiver module 902 is configured to receive the ODU container that is sent by a previous-hop intermediate node.

In some embodiments, the processing module 1001 is specifically configured to: decapsulate the second ODU container to a first ODU container through a GMP; and perform the difference calculation on the third PD value in the first ODU container and the fourth PD value, to obtain the fifth PD value.

For a process in which the processing module 1001 obtains the fifth PD value, refer to step 612 in the embodiment shown in FIG. 6B.

In some embodiments, the first ODU container further bears a transmission service, and the processing module 1001 is further configured to decapsulate the first ODU container though a BMP, to obtain the transmission service.

In a scenario in which both the service and the clock are transmitted, after the clock is recovered, a data portion, namely, the corresponding transmission service, also needs to be recovered. For details of the process, refer to step 612 in the embodiment shown in FIG. 6B. Details are not described herein again.

In some embodiments, the transmission service is a CBR service, the first clock is a CBR clock that is recovered by the generation end from the transmission service, and the second clock is a second CBR clock. In this case, it is equivalent that there is an association relationship between the transmission service and the transmitted clock, for example, between the CBR service and the CBR clock herein.

In some embodiments, the processing module 1001 is further specifically configured to: perform a loop low-pass filter LPF calculation based on the fifth PD value, to obtain a frequency control word; and tune a local oscillator based on the frequency control word, to output the first clock.

For a specific process in which the processing module 1001 outputs the CBR clock, refer to step 613 in the embodiment shown in FIG. 6B.

The foregoing separately describes the transmit end, the intermediate node, and the receive end in the embodiments of this application, and the following describes an OTN network transmission system including the three nodes. The system includes the OTN device shown in FIG. 8 that is used as the transmit end, the OTN device shown in FIG. 10 that is used as the receive end, and at least one OTN device shown in FIG. 9 that is used as the intermediate node. Specifically:

the transmit end is configured to: obtain a first ODU container; perform phase discrimination on an obtained first clock and a first ODU clock of the transmit end, to generate a first PD value; insert the first PD value into an overhead of the first ODU container; and encapsulate the first ODU container into a second ODU container, and send the second ODU container to the intermediate node, where a rate of the second ODU container is higher than a rate of the first ODU container;

the intermediate node is configured to:
obtain the first ODU clock of the transmit end; perform phase discrimination on the first ODU clock and a second ODU clock of the intermediate node, to generate a second PD value; replace the first PD value in the second ODU container with a third PD value, where the third PD value is obtained after a difference calculation is performed on the first PD value and the second PD value; and send the second ODU container to the receive end; and the receive end is configured to: obtain the second ODU clock of the intermediate node; perform phase discrimination on the second ODU clock and a second clock of the receive end, to generate a fourth PD value; perform a difference calculation on the fourth PD value and the third PD value in the second ODU container, to obtain a fifth PD value; and tune a local oscillator based on the fifth PD value, to output the first clock.

It should be noted that all phase detectors used to perform phase discrimination in FIG. 8, FIG. 9, and FIG. 10 are ps-level phase detectors, and therefore a noise caused in a phase discrimination process can be ignored relative to other noises.

Figure 11:
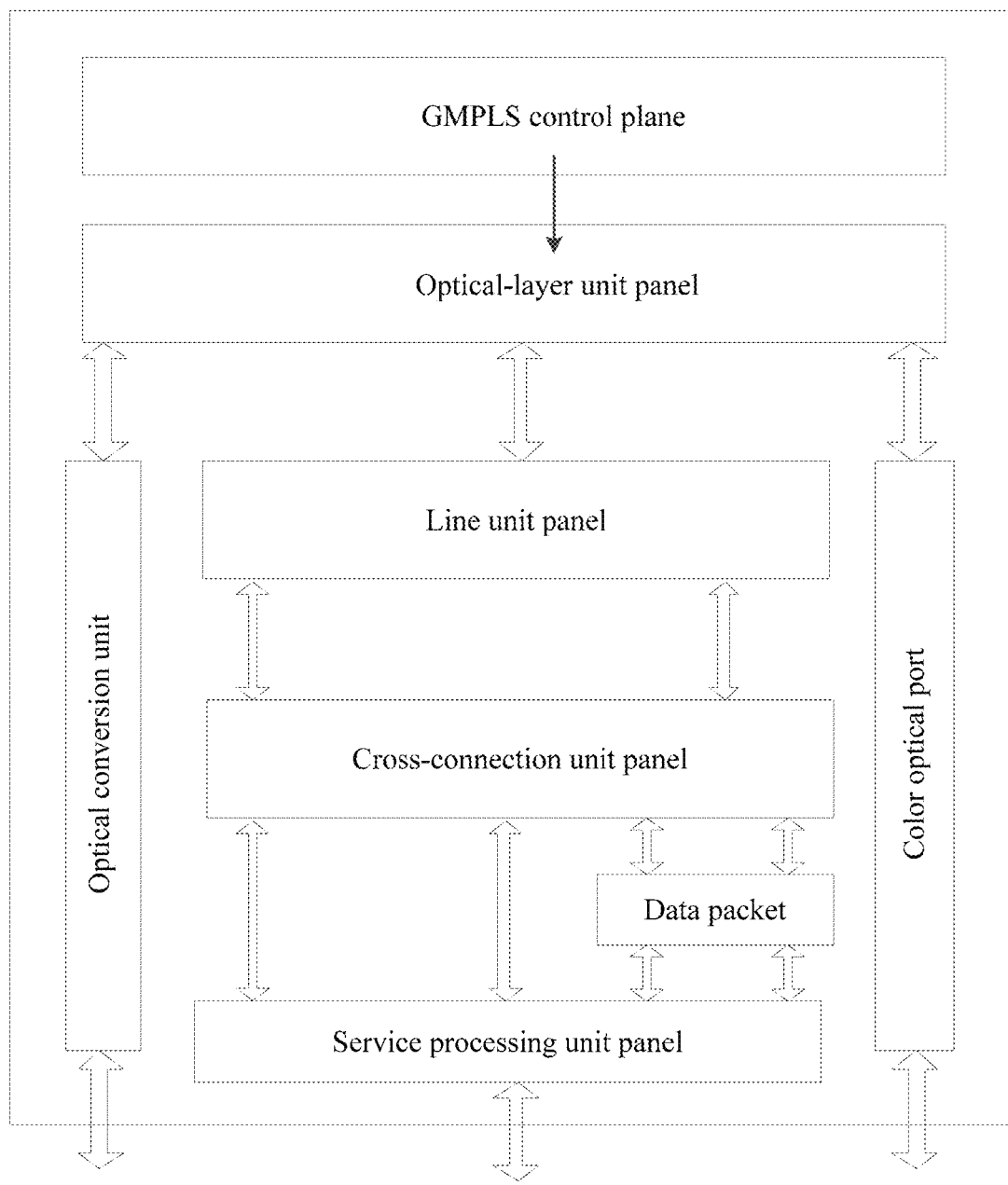
FIG. 11 is a schematic diagram of an OTN device according to an embodiment of this application.

The following describes the OTN device in the embodiments of this application. FIG. 11 is a schematic diagram of an OTN device according to an embodiment of this application. The OTN device includes a GMPLS control panel and an optical-layer unit panel that supports optical cross-connection grooming at an optical layer. The optical-layer unit panel is further connected to a line unit panel, the line unit panel is connected to a cross-connection unit panel, and the cross-connection unit panel is connected to a service processing unit panel. The line unit panel, the cross-connection unit panel, and the service processing unit panel form a module used for cross-connection grooming at an electrical layer. The optical-layer unit panel is further connected to an optical conversion unit and a color optical port used for optical wavelength division multiplexing. The control panel includes a processor, a memory, a transceiver, and an access port. The processor, the memory, and the transceiver are all connected to a bus.

Combination of the electrical layer and the optical layer can implement a function of the processing module in FIG. 8, FIG. 9, or FIG. 10.

The optical-layer unit panel may include a 9-port multiplexing panel, a dynamic wavelength access panel, a 9-port wavelength-selective switching demultiplexing panel, a 9-port wavelength-selective switching multiplexing panel, a 2-port configurable optical add/drop multiplexing panel, a four-dimensional configurable optical add/drop multiplexing panel, and the like.

The module for cross-connection grooming at the electrical layer may include at least one of an optical wavelength switching board, an optical multiplexing/demultiplexing board, a static optical add/drop multiplexing board, a dynamic optical add/drop multiplexing board, a tributary board, a line board, a cross-connection board, a fiber amplifier board, an optical monitoring channel board, a system control and communications board, an optical protection board, an optical spectrum analyzing board, an optical adjustable attenuation board, and an optical power and dispersion equilibrium board.

It may be clearly understood by a person skilled in the art that, for the purpose of convenient and brief description, for a detailed working process of the foregoing system, apparatus, and unit, reference may be made to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, to be specific, may be located in one position, or may be distributed on a plurality of network units. Some or all of the units may be selected based on actual requirements to achieve the objectives of the solutions of the embodiments.

In addition, the functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the method described in the embodiments of this application. The foregoing storage medium includes various media that can store program code, such as a USB flash drive, a removable hard disk, a read-only memory (ROM), a random access memory (RAM), a magnetic disk, and an optical disc.

The foregoing embodiments are merely intended to describe the technical solutions of this application, but not intended to limit this application. A person of ordinary skill in the art may still make modifications to the technical solutions recorded in the foregoing embodiments or make replacements to some technical features thereof, without departing from the scope of the technical solutions of the embodiments of this application.

What is claimed is:

1. A clock transmission method comprising:
   obtaining, by a transmit end, a first optical channel data unit (ODU) container;
   performing, by the transmit end, phase discrimination (PD) on an obtained first clock and a first ODU clock of the transmit end, to generate a first PD value;
   inserting, by the transmit end, the first PD value into an overhead of the first ODU container;
   encapsulating, by the transmit end, the first ODU container into a second ODU container, wherein a rate of the second ODU container is higher than a rate of the first ODU container; and
   sending the second ODU container.

2. The clock transmission method according to claim 1, wherein the method further comprises:
   receiving, by the transmit end, a transmission service; and
   obtaining, by a transmit end, the first ODU container comprises:
   encapsulating, by the transmit end, the received transmission service into the first ODU container.

3. The clock transmission method according to claim 2, wherein the method further comprises:
   recovering, by the transmit end, the first clock from the transmission service.

4. The clock transmission method according to claim 2, wherein the transmission service is a Constant Bit Rate (CBR) service; and
   encapsulating, by the transmit end, the received transmission service into the first ODU container comprises:
   encapsulating, by the transmit end, the received CBR service into the first ODU container through a Bit-synchronous Mapping Procedure (BMP).

5. The clock transmission method according to claim 3, wherein the transmission service is a Constant Bit Rate (CBR) service; and
   encapsulating, by the transmit end, the received transmission service into the first ODU container comprises:
   encapsulating, by the transmit end, the received CBR service into the first ODU container through a Bit-synchronous Mapping Procedure BMP.

6. An optical transport network (OTN) device, comprising:
   a memory, configured to store computer-executable program code; and
   at least one processor, coupled to the memory, wherein
   the program code comprises one or more instructions, and when executed by the at least one processor, the one or more instructions cause the at least one processor to perform the following:
   obtaining a first optical channel data unit (ODU) container;
   performing phase discrimination on an obtained first clock and a first ODU clock of the OTN device, to generate a first phase discrimination (PD) value;
   inserting the first PD value into an overhead of the first ODU container;
   encapsulating the first ODU container into a second ODU container, wherein a rate of the second ODU container is higher than a rate of the first ODU container; and
   sending the second ODU container.

7. The OTN device according to claim 6, wherein the at least one processor is further caused to perform:
   receiving a transmission service; and
   encapsulating the received transmission service into the first ODU container.

8. The OTN device according to claim 7, wherein the at least one processor is further caused to perform:
   recovering the first clock from the transmission service.

9. The OTN device according to claim 7, wherein the transmission service is a Constant Bit Rate (CBR) service, and the at least one processor is caused to perform:
   encapsulating the received CBR service into the first ODU container through a Bit-synchronous Mapping Procedure (BMP).

10. The OTN device according to claim 8, wherein the transmission service is a CBR service, and the at least one processor is caused to perform:
    encapsulating the received CBR service into the first ODU container through a BMP.

11. An optical transport network (OTN) device, comprising:
- a memory, configured to store computer-executable program code; and
- at least one processor, coupled to the memory, wherein the program code comprises one or more instructions, and when executed by the at least one processor, the one or more instruction cause the at lease one processor to perform the following:
- receiving a second optical channel data unit (ODU) container;
- obtaining a second ODU clock of the second ODU container;
- performing phase discrimination on the second ODU clock and a second clock of the OTN device, to generate a fourth phase discrimination (PD) value;
- performing a difference calculation on the fourth PD value and a third PD value borne in the second ODU container, to obtain a fifth PD value, wherein the third PD value is obtained after a difference calculation is performed on a first PD value and a second PD value, the second PD value is generated after phase discrimination is performed on a first ODU clock and the second ODU clock, the first PD value is obtained after phase discrimination is performed on a first clock and the first ODU clock, the first ODU clock is an ODU clock of a generation end of the first PD value, and the first clock is obtained by the generation end; and
- adjusting the second clock as the first clock based on the fifth PD value, and output the first clock.

12. The OTN device according to claim 11, wherein the at least one processor is caused to perform:
- de-capsulating the second ODU container to a first ODU container through a Generic Mapping Procedure (GMP); and
- performing the difference calculation on the third PD value in the first ODU container and the fourth PD value, to obtain the fifth PD value.

13. The OTN device according to claim 12, wherein the first ODU container further bears a transmission service, and the at least one processor is further caused to perform:
- de-capsulating the first ODU container though a BMP, to obtain the transmission service.

14. The OTN device according to claim 13, wherein the transmission service is a Constant Bit Rate (CBR) service, the first clock is a CBR clock that is recovered by the generation end from the transmission service, and the second clock is a second CBR clock.

15. The OTN device according to claim 11, wherein the at least one processor is further caused to perform:
- performing a loop low-pass filter (LPF) calculation based on the fifth PD value, to obtain a frequency control word; and
- tuning a local oscillator based on the frequency control word, to output the first clock.

16. The OTN device according to claim 12, wherein the at least one processor is further caused to perform:
- performing a loop low-pass filter (LPF) calculation based on the fifth PD value, to obtain a frequency control word; and
- tuning a local oscillator based on the frequency control word, to output the first clock.

17. The OTN device according to claim 13, wherein the at least one processor is further caused to perform:
- performing a loop low-pass filter (LPF) calculation based on the fifth PD value, to obtain a frequency control word; and
- tuning a local oscillator based on the frequency control word, to output the first clock.

* * * * *